United States Patent
Dandl et al.

(10) Patent No.: US 12,003,080 B2
(45) Date of Patent: Jun. 4, 2024

(54) LINE ARRANGEMENT, CONNECTION ARRANGEMENT AND ENERGY TRANSMISSION SYSTEM

(71) Applicant: Rosenberger Hochfrequenztechnik GmbH & Co. KG, Fridolfing (DE)

(72) Inventors: Christian Dandl, Fridolfing (DE); Johann Edfelder, Ainring (DE); Johannes Hegenauer, Bergen (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 190 days.

(21) Appl. No.: 17/718,366

(22) Filed: Apr. 12, 2022

(65) Prior Publication Data

US 2022/0337039 A1    Oct. 20, 2022

(30) Foreign Application Priority Data

Apr. 16, 2021    (EP) .................................. 21 168 864

(51) Int. Cl.
*H02G 3/03*      (2006.01)
*B60R 16/02*     (2006.01)
(Continued)

(52) U.S. Cl.
CPC ........... *H02G 3/03* (2013.01); *B60R 16/0207* (2013.01); *H01B 7/423* (2013.01); *H01R 13/005* (2013.01); *B60L 2240/36* (2013.01)

(58) Field of Classification Search
CPC .. H01R 31/06; H01R 13/005; H01R 2201/26; H01B 7/426; H01B 7/0009; H01B 7/02;
(Continued)

(56) References Cited

U.S. PATENT DOCUMENTS 3,042,889 A  *  7/1962  Johnston .................. H02G 5/08
                                                  174/88 B
3,347,975 A  *  10/1967  Shannon .................. H02G 5/06
                                                  174/70 B
(Continued)

FOREIGN PATENT DOCUMENTS

DE          19921310 A1    11/2000
DE      102006052815 A1     5/2008
(Continued)

*Primary Examiner* — Timothy J Thompson
*Assistant Examiner* — Michael F McAllister
(74) *Attorney, Agent, or Firm* — Dickinson Wright PLLC

(57) ABSTRACT

A line arrangement comprising an electrical line which has at least one electrical insulator and at least one electrical conductor which runs at least in some sections adjacently to the electrical insulator along a longitudinal axis of the electrical line. The line arrangement additionally has a passive heat dissipator which runs at least in some sections along the longitudinal axis and which has at least one heat-absorbing surface portion and at least one heat-emitting surface portion thermally connected to the heat-absorbing surface portion. The heat-absorbing surface portion is brought towards the electrical conductor at least to such an extent that the heat-absorbing surface portion forms a thermally operative connection to the electrical conductor in order to dissipate waste heat from the electrical conductor to the heat-emitting surface portion.

19 Claims, 6 Drawing Sheets

(51) Int. Cl.
*H01B 7/42* (2006.01)
*H01R 13/00* (2006.01)

(58) Field of Classification Search
CPC . H01B 7/423; B60R 16/0207; B60R 16/0215; H02G 3/03; H02G 5/10; Y02T 10/70; B60L 2240/36
USPC ........................................................ 361/624
See application file for complete search history.

(56) References Cited

U.S. PATENT DOCUMENTS

| | | | | |
|---|---|---|---|---|
| 3,384,856 | A * | 5/1968 | Fisher | H02G 5/08 |
| | | | | 174/68.2 |
| 3,681,509 | A * | 8/1972 | Johnston | H02G 5/06 |
| | | | | 174/16.3 |
| 3,720,777 | A * | 3/1973 | Sampson | D04C 1/02 |
| | | | | 174/15.5 |
| 3,798,346 | A * | 3/1974 | Kreuzer | H01B 7/426 |
| | | | | 174/15.6 |
| 4,945,188 | A * | 7/1990 | Jackson | H02G 5/002 |
| | | | | 174/70 B |
| 6,689,956 | B2 * | 2/2004 | Alexander | H02G 5/10 |
| | | | | 361/624 |
| 6,807,041 | B2 * | 10/2004 | Geiger | H05K 7/20472 |
| | | | | 361/103 |
| 2006/0035511 | A1 * | 2/2006 | Mrakovich | F21V 29/713 |
| | | | | 439/404 |
| 2007/0190845 | A1 * | 8/2007 | Mrakovich | F21V 29/713 |
| | | | | 439/404 |
| 2016/0104986 | A1 * | 4/2016 | Sheridan | H01R 25/162 |
| | | | | 439/213 |
| 2019/0305531 | A1 * | 10/2019 | Fujimura | B60R 16/0215 |

FOREIGN PATENT DOCUMENTS

| | | |
|---|---|---|
| DE | 102008030338 A1 | 9/2009 |
| DE | 102016221857 A1 | 5/2018 |
| DE | 202018102911 U1 | 8/2019 |

* cited by examiner

LINE ARRANGEMENT, CONNECTION ARRANGEMENT AND ENERGY TRANSMISSION SYSTEM

CROSS-REFERENCE TO RELATED APPLICATION

This application claims priority to European Patent Application No. 21 168 864.3, filed on Apr. 16, 2021, and which is hereby incorporated by reference in its entirety.

TECHNICAL FIELD

The invention relates to a line arrangement comprising an electrical line which has at least one electrical insulator and at least one electrical conductor, according to the preamble of claim 1.

The invention additionally relates to a connection arrangement having two electrical connectors for electrical connection to an electrical device each, and a line arrangement.

The invention further relates to an energy transmission system having a connection arrangement.

BACKGROUND OF THE INVENTION

Special requirements are placed on conductor and connection arrangements as well as energy transmission systems for the transmission of electrical energy, particularly in the high-voltage area of vehicle technology. For example, electrical lines are used in electric and/or hybrid vehicles to connect accumulators to each other, to supply accumulators with electrical charging current and to supply the energy stored in the accumulators to an electrical consumer. For this purpose, currents of several hundred amperes are sometimes transmitted at voltages of several hundred volts.

In order to keep the heat input into the line arrangement sufficiently low during transmission of the high electrical power, large line cross sections are sometimes used. However, the high material requirements associated with this increase the cost of providing the lines; moreover, such high-voltage lines introduce a not inconsiderable proportion of weight into the vehicles.

Alternatively or additionally to the use of large line cross sections, it is also known to dissipate the waste heat generated due to the high current flow in the electrical conductors by means of actively cooled high-voltage cables. In such lines, a cooling channel is guided longitudinally through the line, is connected to a cooling circuit and is passed through by a cooling liquid to remove the heat. A corresponding cable is described, for example, in DE 199 21 310 A1.

The known cooling solution is extremely complex and costly. Due to the many components required to provide the cooling circuit, the cooling system additionally requires a comparatively large amount of installation space. The known cooled lines are therefore also suitable for mass production only to a limited extent.

In addition to their use in high-voltage technology, cooled lines can also be advantageous in communications engineering, since cooling allows higher power densities to be achieved at the same limit temperature. However, the disadvantages of the known cooling techniques outweigh the advantages mentioned, which is why cooled lines are not generally used in communications engineering at present.

SUMMARY OF THE INVENTION

In view of the known prior art, the object of the present invention is to provide a line arrangement that provides economical, robust, yet effective heat dissipation from the electrical line.

The present invention also addresses the problem of providing a connection arrangement and an energy transmission system with a line arrangement improved in respect of heat dissipation.

The problem is solved for the line arrangement with the features described in claim 1. With regard to the connection arrangement, the problem is solved by the features of claim 14 and, with regard to the energy transmission system, by claim 15.

The dependent claims and the features described below relate to advantageous embodiments and variants of the invention.

A line arrangement is provided comprising an electrical line.

The electrical line can be designed in particular for transporting electrical energy against the background of energy supply and/or signal transmission in communications engineering or high-frequency engineering. For this purpose, the electrical line can be connected to an electrical circuit or power network, in particular to connect two or more electrical devices to each other, for example to connect one electrical power source or a plurality of electrical power sources to one electrical consumer or to a plurality of electrical consumers.

An electrical line in the context of the invention can be a flexible or non-flexible line. The electrical line can be an electrical cable, for example a high-voltage cable or a data cable. However, the electrical line can also be, for example, a busbar line or a conductor line.

Optionally, the line arrangement can also have more than one electrical line, for example two electrical lines, three electrical lines, four electrical lines, or even more electrical lines, each having an identical or different structure, wherein the additional electrical lines preferably have the structure described below, but can also have a conventional structure if necessary.

According to the invention, the electrical line has at least one electrical insulator and at least one electrical conductor. The electrical conductor runs at least in some sections adjacently to the electrical insulator along a longitudinal axis of the electrical line.

The electrical conductor can be made fundamentally of any material with which a low-impedance conductive connection can be provided. The electrical conductor can preferably be made of a metal, for example copper, aluminum and/or silver.

The electrical conductor can be in the form of a wire, stranded wire (i.e. a composite of a plurality of individual wires), strip or rail. Preferably, the electrical conductor is an elongate component.

In a further development of the invention, it can be provided that the at least one electrical conductor is formed as an elongate flat conductor with a flat cross section. In principle, however, any cross sections or geometries are possible for forming the electrical conductor. Insofar as a plurality of electrical conductors are provided, these can also be formed differently or can have different cross sections. For example, the at least one electrical conductor can also have a round, square or comb-shaped cross section.

Preferably, the longitudinal axes of the line arrangement, the electrical line, the electrical insulator and/or the electrical conductor run at least substantially, preferably completely, parallel to one another, and possibly even coaxially.

The electrical line can have exactly one electrical conductor. In principle, however, the electrical line can have any number of electrical conductors, preferably exactly two electrical conductors, but possibly also more than two electrical conductors, for example three, four, five, six, seven, eight or even more electrical conductors, each with an identical or different structure. Insofar as a plurality of electrical conductors are provided, they preferably run side by side or interlaced or twisted along the longitudinal axis of the electrical line. Preferably, the plurality of electrical conductors are spaced apart or electrically insulated from each other.

The conductor cross section of the at least one electrical conductor can be, for example, up to 10 mm$^2$, preferably up to 30 mm$^2$, particularly preferably up to 60 mm$^2$, even more preferably up to 90 mm$^2$, for example also up to 200 mm$^2$ or more. In particular, a conductor cross section can be provided that is suitable for electrical energy transmission in high-voltage technology, i.e. for transmitting high electrical currents (for example 100 A to 2 kA) at AC voltages of 30 V to 1 kV or more or DC voltages of 60 V to 2.0 kV or more, especially in vehicle technology.

The electrical insulator, which will be described in more detail below, can be formed as a component of the electrical line to perform various tasks. The electrical insulator can serve as a touch guard to prevent people, objects, or animals from inadvertently coming into contact with the electrical conductor. The electrical insulator can additionally be usable for spacing a plurality of electrical conductors. In addition, the electrical insulator can mechanically fix, guide and/or protect the at least one electrical conductor against mechanical damage.

The electrical insulator can be formed fundamentally from any material that has a good electrical insulating effect. Preferably, the electrical insulator can be made of silicone, for example of a silicone tube or a silicone tape. However, other synthetic polymers and other materials can also be provided.

The electrical line can have exactly one electrical insulator. In principle, however, the electrical line can have any number of electrical insulators, preferably exactly two electrical insulators, but possibly also more than two electrical insulators, for example three, four, five, six, seven, eight or even more electrical insulators, each with an identical or different structure. Insofar as a plurality of electrical insulators are provided, these preferably run side by side and/or into one another along the longitudinal axis of the electrical line.

The at least one electrical conductor can be attached to the at least one electrical insulator and/or guided in or on the electrical insulator. The at least one electrical conductor can be connected to the at least one electrical insulator by any form-fit, force-fit and/or integral bonding techniques.

In accordance with the invention, the line arrangement has at least one passive heat dissipator which runs along the longitudinal axis at least in some sections.

The heat dissipator is preferably formed from a metal, for example a sheet metal. Preferably, the heat dissipator is an elongate component, particularly preferably a flat, elongate component. The heat dissipator can be formed in one part or in one piece, preferably as a stamped and bent part.

In principle, the heat dissipator can be formed of any material, but is preferably formed of a material with high thermal conductivity, such as a material with a thermal conductivity of 10 W/(m·K) or more, preferably 100 W/(m·K) or more, particularly preferably 200 W/(m·K) or more, even more preferably 400 W/(m·K) or more. For example, the heat dissipator can be formed of a copper sheet or an aluminum sheet.

The heat dissipator is preferably not a pipe or a line for transporting a fluid as part of an active cooling system.

Preferably, the electrical line can have exactly one passive heat dissipator. In principle, however, the electrical line can have any number of (passive) heat dissipators, for example two (passive) heat dissipators, but possibly also more than two (passive) heat dissipators, for example three, four, five, six, seven, eight or even more (passive) heat dissipators, each with an identical or different structure. If a plurality of (passive) heat dissipators are provided, they preferably run axially offset to each other along the longitudinal axis of the electrical line, but if necessary also partially or completely axially overlapping or in parallel/side by side.

Preferably, the passive heat dissipator is spaced from the at least one electrical conductor or electrically isolated from the at least one electrical conductor. However, in special cases, the passive heat dissipator can also be electrically connected to at least one of the electrical conductors, for example for low-voltage applications, or when the heat dissipator is not electrically conductively connected to any other conductive component.

Preferably, the electrical line has no active cooling or no active heat dissipator. For the sake of simplicity, the passive heat dissipator will therefore also be referred to sometimes as just the "heat dissipator".

According to the invention, the heat dissipator has at least one heat-absorbing surface portion and at least one heat-emitting surface portion thermally connected to the heat-absorbing surface portion. The heat dissipator is thus able to absorb heat via the heat-absorbing surface portion, in particular by thermal conduction, thermal convection or thermal radiation, and to dissipate it along a heat path in the direction of the heat-emitting surface portion. For this purpose, the heat-emitting surface portion can be thermally connected to an adjacent heat sink described in more detail below.

Preferably, the heat-absorbing surface portions and the heat-emitting surface portions are joined together integrally. In particular, the surface portions can be different surface portions of a common sheet material forming the passive heat dissipator.

Insofar as a plurality of heat-absorbing surface portions are provided, these are preferably axially offset from one another along the longitudinal axis of the electrical line. This also applies analogously to a plurality of heat-emitting surface portions, which can then form, for example, the individual lugs described below. In principle, however, a plurality of heat-emitting/heat-absorbing surface portions can also be arranged at the same axial position along the longitudinal axis or can at least partially overlap axially, for example by the surface portions being gathered together, fanned out or comb-shaped.

According to the invention, the heat-absorbing surface portion is brought towards the electrical conductor at least to such an extent that the heat-absorbing surface portion forms a thermal operative connection to the electrical conductor in order to dissipate waste heat from the electrical conductor to the heat-emitting surface portion.

The dissipation of waste heat from the at least one electrical conductor is understood to mean in particular a measurable heat dissipation that is relevant for the practical application of the line arrangement. In particular, this is performed in such a way that by dissipating heat from the electrical conductor by means of heat dissipation to the heat-absorbing surface portion, the electrical conductor is not able to exceed a defined maximum temperature during normal operation, i.e. cannot overheat due to the thermal operative connection to the heat dissipator.

The heat-absorbing surface portion of the heat dissipator is preferably as close as technically possible to the heat-generating electrical conductor, but is preferably electrically insulated from the electrical conductor.

In particular, the heat-absorbing surface portion can also extend adjacently to a plurality of electrical conductors along the longitudinal axis through the electrical line, for example, running between two adjacent electrical conductors or at least partially encircling a plurality of electrical conductors.

By using the proposed passive heat dissipator, the structure of an electrical line for use in high-voltage technology, communications technology or high-frequency technology can be technically simple, despite the cooling provided, which makes the electrical line particularly economical to manufacture. The proposed line arrangement is thus also advantageously suitable for mass production.

The inventors have recognized that passive heat dissipation can provide excellent results, and accordingly can be an advantageous alternative to active cooling. Preferably, it is possible to completely dispense with the provision of a complex cooling circuit.

At this juncture, it should be emphasized that in addition to the passive heat dissipator, active cooling can also be provided, preferably not inside the electrical line but adjacently to the electrical line, for example to actively dissipate the heat from the heat-emitting surface portion of the heat dissipator by means of a fluid (liquid or gas) by means of a flow machine (e.g. by a pump or a fan) and optionally to make it usable elsewhere. As a rule, however, supplementary active cooling is not necessary.

In an advantageous further development of the invention, it can be provided that the at least one electrical insulator is formed as an electrically insulating encasement or cable sheath, wherein the at least one electrical conductor runs at least in some sections along the longitudinal axis inside the electrically insulating encasement.

Preferably, all components of the electrical line extend inside the insulating encasement. The insulating encasement can thus provide a protective outer sleeve for the electrical line, in particular for protection against contact, for mechanical protection (for example against damage, corrosion and/or contamination) and/or for sealing against liquids, gases and/or contamination particles.

In a further embodiment of the invention, it can also be provided that the at least one insulator is formed as an electrically insulating spacer element, wherein at least two of the electrical conductors are spaced apart from each other by means of the electrically insulating spacer element.

Insofar as the electrical line has only a single electrical insulator, this is preferably formed as an insulating encasement (in the manner of a cable sheath) if only a single electrical conductor is present, and as an insulating spacer element if at least two electrical conductors are present (with only optional complete encasement of the two conductors).

It can be provided in principle that in addition to an electrically insulating spacer element, a separate electrically insulating encasement is also provided, in particular to jointly encase a plurality of electrical conductors spaced apart from the at least one insulating spacer element and the insulating spacer element.

According to a further development of the invention, it can be provided that the heat dissipator is formed of a flat, elongate material. The heat dissipator can have a first longitudinal boundary and a second longitudinal boundary (i.e., a first and second longitudinal end) with respect to its longitudinal extension, and a first transverse boundary and a second transverse boundary (i.e., a first and second transverse end) with respect to its transverse extension.

Preferably, the heat dissipator has two main side surfaces lying parallel to one another, as well as only a small thickness in relation to the transverse extension of the main side surfaces, for example a thickness of only a few millimeters (for example a thickness of up to 10 mm, preferably a thickness of up to 5 mm, further preferably a thickness of up to 2 mm, for example a thickness of up to 1 mm). In the present context, the two largest side surfaces of the heat dissipator in terms of area are referred to as "main side surfaces". The surface portions (heat-absorbing and heat-dissipating) are preferably distributed over the main side surfaces or extend at least over partial regions of the main side surfaces, as will be described below.

Preferably, the length of the heat dissipator corresponds at least substantially, preferably exactly, to the length of the electrical conductor.

It can be provided that the heat-absorbing surface portion and the heat-emitting surface portion each span one of the main side surfaces or both of the main side surfaces, that is, extend in the longitudinal direction (with respect to the longitudinal axis) and in the transverse direction.

For example, each of the two surface portions can start from one of the two transverse boundaries. Thus, preferably, the heat-absorbing surface portion can extend from the first transverse boundary and the heat-emitting surface portion can extend from the second transverse boundary, wherein the surface portions can merge into each other in a middle portion between the two transverse boundaries. The central portion can be disposed between transverse end portions of the heat dissipator, wherein the transverse end portions extend from the transverse boundaries. The heat dissipator is thus capable of dissipating heat from one transverse boundary to the other transverse boundary.

However, it can also be provided that the heat-absorbing surface portion or the heat-emitting surface portion is stretched only in a central portion between the two transverse boundaries, wherein at least one of the other surface portions extends starting from at least one of the two transverse boundaries, preferably starting from both transverse boundaries. A central portion between the two transverse boundaries can thus optionally form the heat-absorbing or the heat-emitting surface portion, wherein one of the other surface portions extends from one or both transverse boundaries in each case.

In principle, however, the heat-absorbing surface portion and the heat-emitting surface portion can be distributed as desired over the side surfaces of the passive heat dissipator, in particular distributed on the main side surfaces. For example, it can be provided that the heat-absorbing surface portion is arranged on the main side surface of the heat dissipator facing the electrical conductor and the heat-emitting surface portion is arranged on the main side surface of the heat dissipator facing away from the electrical conductor, wherein it is also possible for the surface portions to extend completely over the respective main side surfaces.

The heat dissipator can optionally also be designed as a sleeve-shaped sheet metal component, for example as a deep-drawn, sleeve-shaped sheet metal component. The inner lateral surface of the sleeve-shaped heat dissipator can form the heat-absorbing surface portion and can face the electrical line or the electrical conductor. The outer lateral surface of the sleeve-shaped heat dissipator can form the heat dissipating surface portion and face away from the electrical line or the electrical conductor. The sleeve-shaped heat dissipator can be completely closed along its circumference and can surround the electrical line or the electrical conductor. However, the sleeve-shaped heat dissipator can also be slotted along its longitudinal axis, for example to facilitate mounting on the electrical line or the electrical conductor and/or to optionally provide a channel to the electrical conductor through the slot, for example to guide additional heat dissipators to the outside. The axial length of the sleeve-shaped heat dissipator can correspond to the axial length of the electrical line or the electrical conductor, but preferably the heat dissipator is designed to be shorter, wherein a plurality of sleeve-shaped heat dissipators can then be arranged distributed along the longitudinal axis of the electrical line (in particular axially spaced apart). The sleeve-shaped heat dissipator can optionally have one or more cooling fins or other structures that improve heat dissipation on its outer lateral surface facing away from the electrical line.

In particular, the heat dissipator can also have a plurality of heat-emitting surface portions or heat-absorbing surface portions independent of each other (distributed in the manner of islands on the main side surfaces).

In particular, it can be provided that the heat dissipator has different functional regions in different combinations. In a first functional region, one of the heat-absorbing surface portions can be formed on each of the two main surfaces of the heat dissipator facing away from each other. In a second functional region, one of the heat-emitting surface portions can be formed on each of the two main surfaces of the heat dissipator facing away from each other. In a third functional region, one of the heat-absorbing surface portions can be provided on one of the two main surfaces and one of the heat-emitting surface portions can be provided on the other main surface. Preferably, at least two different functional regions merge into each other along the transverse extension of the heat dissipator. For example, at least two different functional regions can be arranged between the first transverse extension and the second transverse extension of the heat dissipator.

In an advantageous further development of the invention, it can be provided that the heat-absorbing surface portion and the heat-emitting surface portion are arranged relative to one another in such a way that a heat path formed between the surface portions, along which the waste heat of the electrical conductor is dissipated, runs at an angle, preferably at right angles, to the longitudinal axis.

The waste heat can thus advantageously be dissipated transversely to the direction of current flow along a heat path, preferably along a plurality of heat paths.

Preferably, it can be provided that the heat-absorbing surface portion runs at least substantially plane-parallel to an outer surface of the electrical conductor, in particular in the case of a flat conductor. In the case of a round conductor, the heat-absorbing surface portion can preferably be arranged concentrically or coaxially with the electrical conductor.

In this way, particularly advantageous heat absorption or heat transfer can take place between the electrical conductor and the heat-absorbing surface portion.

Preferably, the heat-absorbing surface portion and at least one of the outer surfaces of the electrical conductor are arranged opposite each other.

It can be provided that the heat-absorbing surface portion follows the course of the outer surface of the electrical conductor at least in some sections (e.g., circumferentially around the electrical conductor). The heat-absorbing surface portion can optionally be wrapped around the electrical conductor so that the heat-absorbing surface portion is adjacent to a plurality of outer surfaces or side surfaces of the electrical conductor, for example, two adjacent side surfaces, three adjacent side surfaces, or four adjacent side surfaces of the electrical conductor.

According to a further development of the invention, it can be provided that the heat dissipator comprises a plurality of lugs spaced from each other along the longitudinal axis, forming the heat dissipating surface portion, and branching laterally from the at least one heat-absorbing surface portion.

It has been shown that this can save material while at the same time providing a sufficient heat dissipation effect, especially if the spacing and dimensions of the lugs are determined in advance for the intended application by means of appropriate simulations or measurements, and in particular if the lugs are provided at regular intervals along the longitudinal axis.

In a further development of the invention, it can be provided that the heat-absorbing surface portion of the heat dissipator runs at least substantially inside the electrically insulating encasement.

Alternatively or additionally, in a particularly preferred variant of the invention, it can be provided that the heat-absorbing surface portion of the heat dissipator runs at least substantially inside the electrically insulating spacer element.

The fact that the heat-absorbing surface portion runs at least substantially, preferably completely, inside the electrical insulator means that, on the one hand, a particularly targeted heat transfer can be provided between the at least one electrical conductor and the heat-absorbing surface portion and, on the other hand, the heat dissipator can be mechanically fixed or guided by the insulator.

The electrical insulator (e.g., the insulating encasement and/or the insulating spacer element) can have an elongate guide channel for receiving the heat-absorbing surface portion extending along the longitudinal axis. However, the heat-absorbing surface portion can also run along the surface of an inner wall of the electrical insulator that is present anyway. In addition, the heat-absorbing surface portion can also be merely embedded in the electrical insulator, for example recessed in a longitudinal groove or in another recess in an outer surface of the electrical insulator.

In principle, however, it can also be provided that the heat-absorbing surface portion does not run through the electrical insulator at all, but rather, for example, only runs along or on an outer surface of the electrical insulator.

The heat-absorbing surface portion can be connected to or attached to the electrical insulator by any form-fit, force-fit and/or integrally bonding techniques. However, the heat-absorbing surface portion does not necessarily have to be attached to the electrical insulator either.

In an advantageous further development of the invention, it can be provided that the heat-emitting surface portion of the heat dissipator is led out laterally from the electrically insulating encasement and/or laterally from the electrically insulating spacer element. The electrical insulator can have corresponding longitudinal slots for leading out the heat-emitting surface portion or the heat-emitting surface portions.

In particular, the individual lugs already mentioned above can be led out of the electrical insulator. However, the heat-emitting surface portion can also be led out of the electrical insulator as a continuous portion along the full length of the electrical line.

In a further development of the invention, it can be provided that the heat-absorbing surface portion of the heat dissipator extends along the longitudinal axis substantially or over the entire length of the electrical conductor.

The fact that the heat-absorbing surface portion extends over the preferably complete length of the electrical conductor means that the waste heat can be dissipated to a correspondingly high degree. In particular, uniform heat dissipation can be made possible along the longitudinal extension of the electrical line.

In an advantageous further development of the invention, it can be provided that the heat-emitting surface portion has at least one connection region which is designed to connect the heat-emitting surface portion in a thermally conductive manner to an adjacent structure, in particular a heat sink.

The adjacent structure or heat sink is preferably not part of the line arrangement. The heat sink or the structure containing the heat sink can, for example, be a body part of a vehicle.

In the context of the invention, the heat sink can also be a heat storage device that can store the heat for later use, release it as needed, and/or convert it (temporarily or permanently) into another form of energy. The heat sink can optionally be connected to an active cooling circuit or coolant circuit to transport the heat by means of a fluid and a flow machine.

Optionally, for example, a blower or a fan can be provided to improve heat dissipation from the heat-emitting surface portion and/or from the heat sink, for example by passing ambient air over the heat-emitting surface portion and/or the heat sink.

A plurality of connection regions can also be provided and/or the at least one connection region can be formed for multiple connection between the heat-emitting surface portion and the heat sink to improve the heat transfer.

The connection region can be connected to the heat sink using any form-fit, force-fit and/or integrally bonding techniques. For example, the connection region can be screwed, riveted, welded or bonded to the heat sink. For example, a clinching process can also be provided. The connection region can have a through-hole or other recess for the passage of a fastening element, for example for the passage of a screw.

The connection region and/or the heat-emitting surface portion can form a straight line, but can optionally also be formed at an angle and, for example, can have an exit angle of 45° to 135°, preferably approximately or exactly 90°. A plurality of angular portions can also be provided. The connection region and/or the heat-emitting surface portion, for example one of the lugs described above, can be formed accordingly. The connection of the heat dissipator to the heat sink can thus be more flexible.

The connection between the connection region and the heat sink can also include heat-conducting means, such as a heat-conducting paste, which is introduced between the connection region and the heat sink. Thermally conductive pads or a thermally conductive adhesive can also be well suited, if necessary.

In an advantageous further development of the invention, it can be provided that the heat-emitting surface portion forms cooling fins.

The cooling fins can increase the surface area of the heat dissipator in the region of the heat-emitting surface portion in order to improve heat transfer to the surrounding environment (e.g., the ambient air or a special cooling fluid or coolant) and/or to the heat sink, in particular by means of increased heat radiation and heat convection.

In an advantageous further development of the invention, it can additionally be provided that the heat emitting surface portion comprises a heat emission layer, having an emissivity greater than the emissivity of the material of the heat dissipator itself.

The heat emission layer can preferably be a dark heat emission layer, for example a dark paint, preferably a black paint. By means of the heat emission layer, the heat radiation of the heat dissipator in the region of the heat-emitting surface portion can be increased, preferably as far as practically possible to approximate the radiation characteristic of a black radiator.

The heat emission layer can be applied to the heat dissipator using various coating techniques (e.g. painting/lacquering/dipping/galvanizing/spraying/powder coating etc.). In principle, however, other attachment techniques can also be suitable, such as gluing on the heat emission layer.

It can be provided to arrange the heat-emitting surface portion with the heat-emitting layer preferably parallel to the adjacent structure, in particular the heat sink, in order to achieve the best possible emission of the heat radiated by the heat dissipator to the adjacent structure, for example a body surface of a vehicle.

The aforementioned measures can improve the heat dissipation from the heat-emitting surface portion. In principle, any measures and means can be provided to improve the heat conduction and/or heat radiation of the heat-emitting surface portion.

In principle, the line arrangement can also be mechanically stably fastened to the adjacent structure, for example the heat sink, by means of the heat dissipator or its connection region. For this purpose, however, it can be necessary to make the heat dissipator sufficiently load-bearing, for example by reinforcing it. Accordingly, mechanical fastening of the line arrangement via the heat dissipator is generally not preferred.

According to a preferred further development, however, it can be provided that the line arrangement has at least one fastening means for mechanically fastening the electrical line to the adjacent structure, for example the heat sink.

The at least one fastening means can be designed, for example, as a support, beam, stilt or other means for a sufficiently mechanically stable fastening of the line arrangement to the structure. It can also be provided to fasten the line arrangement or the electrical line to the adjacent structure by means of cable ties or other lashing and/or fastening means.

As already mentioned, the line arrangement or the electrical line and/or the heat dissipator can be designed to be (non-destructively) bendable or rigid. Preferably, the line arrangement or the electrical line and/or the heat dissipator can be bent at least about a bending axis oriented in the transverse extension of the heat dissipator—i.e., can be bent about the flat side. Bending about a bending axis that is orthogonal to one of the main side surfaces of the heat dissipator is also possible in principle, for example by the electrical conductor and/or the passive heat dissipator being slotted in the region of the outer radius. In order to lay the line arrangement flexibly, twisting or torsion can also be provided in some regions.

The invention also relates to a connection arrangement having at least one electrical connector (preferably two electrical connectors) for electrical connection to a corresponding electrical device, and a line arrangement according to the foregoing and following embodiments. The electrical connectors are each electrically connected to the at least one electrical conductor of the line arrangement.

The proposed passive heat dissipator can provide a connection arrangement that can be manufactured particularly easily and economically, especially if the passive heat dissipator is in the form of a cooling plate.

Preferably, the electrical connectors are spaced from each other along the longitudinal axis, particularly preferably at opposite ends of the line arrangement.

An electrical connector can be a plug connector. An electrical plug connector is known to transmit electrical supply signals and/or data signals to corresponding mating plug connectors. A plug connector or mating plug connector can be a plug, a printed circuit board connector, a panel connector, a socket, a coupling or an adapter. The designation "plug connector" or "mating plug connector" used in the context of the invention is representative of all variants. However, a plug connector, i.e. in particular a detachable, pluggable connection is not absolutely necessary. The electrical connectors can be designed for any (optionally permanent) form-fit, force-fit and/or integrally bonded connection. One, both or all of the connectors can also be omitted completely if necessary.

The invention also relates to an energy transmission system comprising the connection arrangement according to the preceding and following embodiments. It is provided that the first of the two electrical devices is formed as a primary electrical energy source (preferably as an accumulator, accumulator group or charging device for charging accumulators). The second of the two electrical devices is formed as an electrical consumer (preferably as an electric motor, for example as an electric motor of an electric vehicle) or as a secondary energy source (preferably as an accumulator or accumulator group).

Preferably, the invention can be used in a charging path, i.e. to transmit electrical energy starting from a charging device to an accumulator or an accumulator group. However, other applications are also advantageously possible, for example for transmitting electrical energy from an accumulator or accumulator group to a consumer, in particular to an electric motor.

At this juncture it should be mentioned that the term "accumulator" in the context of the invention can mean a single accumulator cell (also called a secondary cell) as well as an interconnected pack comprising a plurality of accumulator cells (also called an "accumulator pack").

A primary or secondary electrical energy source can also be a storage device for electrical energy that is not or not exclusively electrochemical in design, for example a capacitor.

It can additionally also be a non-rechargeable storage device for electrical energy, for example a battery or battery pack.

Particularly advantageously, the invention is suitable for transmitting high electrical currents (e.g., up to 100 amps, up to 200 amps, up to 300 amps, up to 400 amps, up to 500 amps, up to 600 amps, up to 2,000 amps or more) at preferably high electrical voltages (e.g., up to 500 volts, up to 600 volts, up to 700 volts, up to 800 volts, up to 900 volts, up to 1,000 volts, up to 1,100 volts, up to 1,500 volts, up to 2,000 volts or more), for example in automotive engineering, particularly preferably in the field of electromobility.

The invention also relates to a vehicle (preferably an electric vehicle) having a connection arrangement and/or an energy transmission system according to the foregoing and following embodiments. The term "vehicle" describes any means of transport, in particular vehicles on land, in water or in the air, including space vehicles.

Features that have been described in conjunction with one of the subjects of the invention, namely given by the line arrangement according to the invention, the connection arrangement, the energy transmission system or the vehicle, can also be advantageously implemented for the other subjects of the invention. Likewise, advantages mentioned in conjunction with one of the subjects of the invention can also be understood as relating to the other subjects of the invention.

It should also be noted that terms such as "comprising", "having" or "with" do not exclude other features or steps. Furthermore, terms such as "a" or "the" that indicate a singular step or feature do not exclude a plurality of features or steps—and vice versa.

However, in a purist embodiment of the invention, it can also be provided that the features introduced in the invention by the terms "comprising", "having" or "with" are listed exhaustively. Accordingly, one or more listings of features can be considered complete within the scope of the invention, for example, each considered for each claim. For example, the invention can consist solely of the features cited in claim 1.

It should be noted that designations such as "first" or "second," etc., are used primarily for the purposes of distinguishing corresponding device or method features and are not necessarily intended to imply that features are mutually dependent or interrelated.

Furthermore, it should be emphasized that the values and parameters described herein include deviations or fluctuations of ±10% or less, preferably ±5% or less, further preferably ±1% or less, and very particularly preferably ±0.1% or less of the particular designated value or parameter, provided that these deviations are not excluded in the implementation of the invention in practice. The specification of ranges by initial and final values also includes all those values and fractions which are included by the particular designated range, in particular the initial and final values and a corresponding mean value.

The invention also relates to a line arrangement independent of claim 1, comprising an electrical line and a heat dissipator which runs at least in some sections along a longitudinal axis of the electrical line and which is brought towards the electrical line at least to the extent that the heat dissipator is capable of dissipating waste heat of the electrical line. The further features of claim 1 and the dependent claims, as well as the features described in the present description, relate to advantageous embodiments and variants of this line arrangement.

BRIEF DESCRIPTION OF THE DRAWINGS

Exemplary embodiments of the invention are described in more detail below with reference to the drawings.

The figures each show preferred exemplary embodiments in which individual features of the present invention are shown in combination with one another. Features of one exemplary embodiment can also be implemented separately from the other features of the same exemplary embodiment and can accordingly be readily combined by a person skilled in the art with features of other exemplary embodiments to form further useful combinations and sub-combinations.

In the figures, functionally like elements are provided with the same reference signs.

The figures show schematically:

Figure 1:
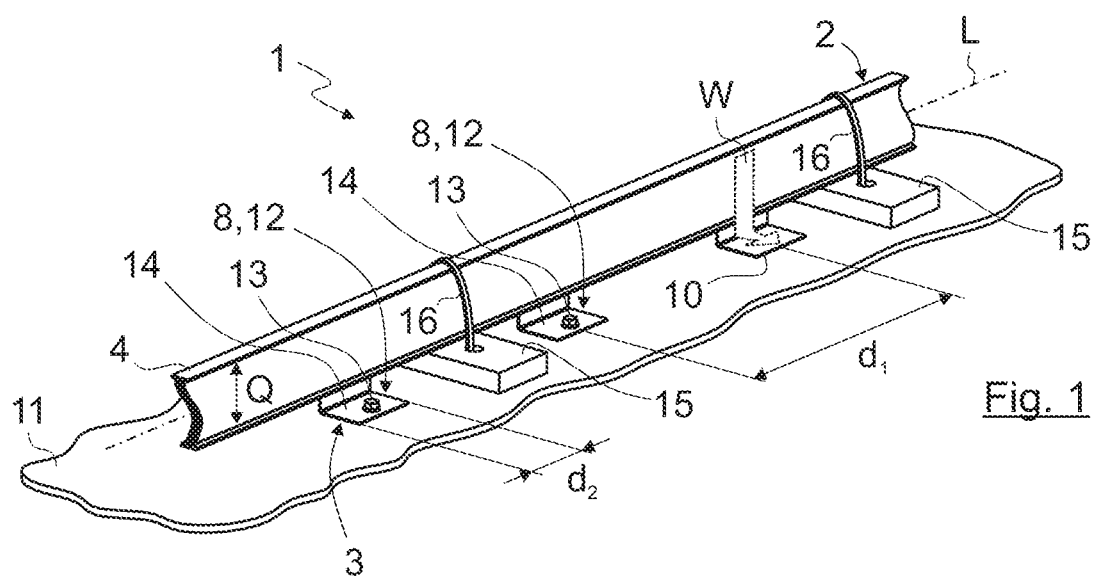
Figure 2:
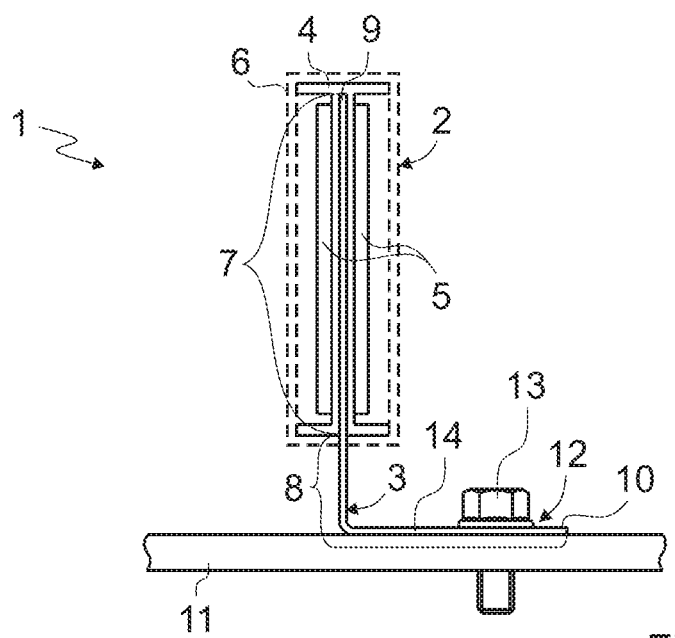
Figure 3:
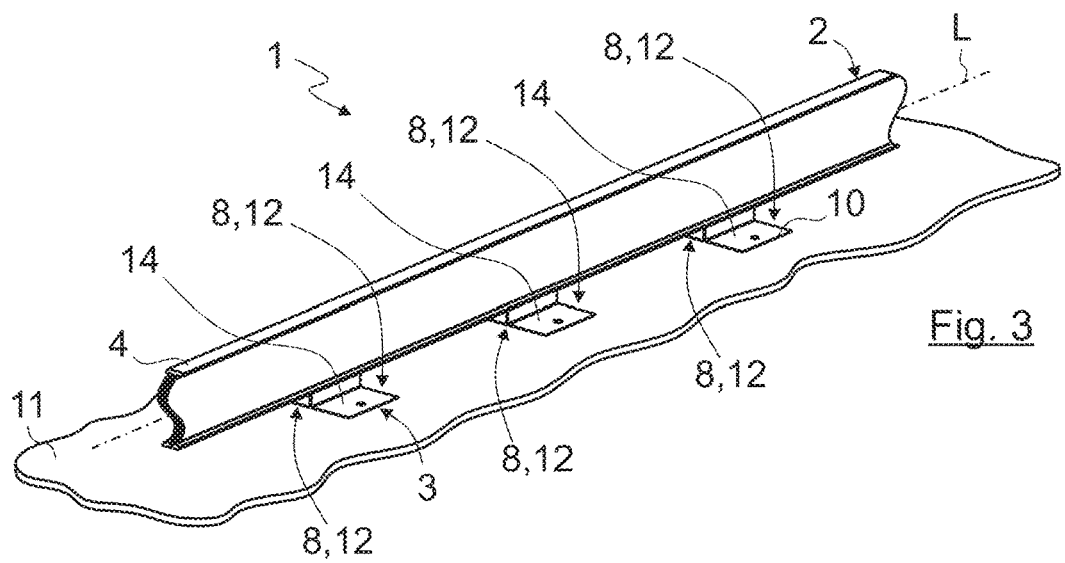
Figure 4:
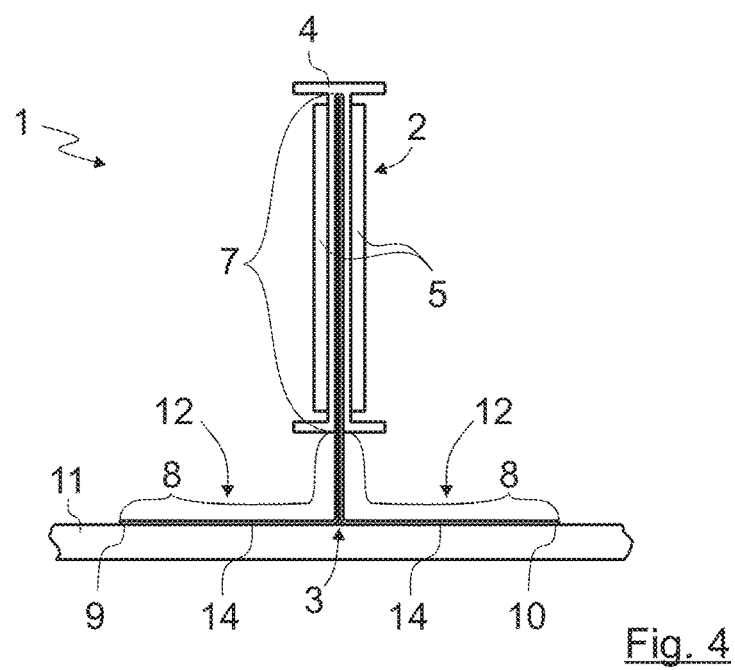
Figure 5:
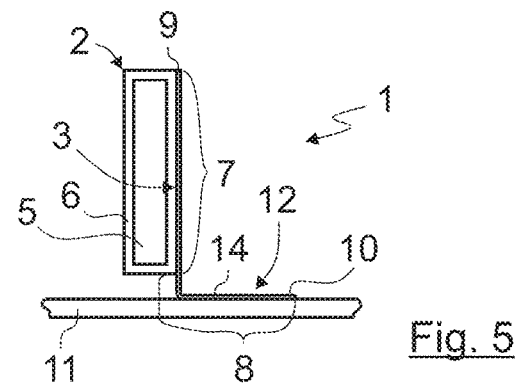
Figure 6:
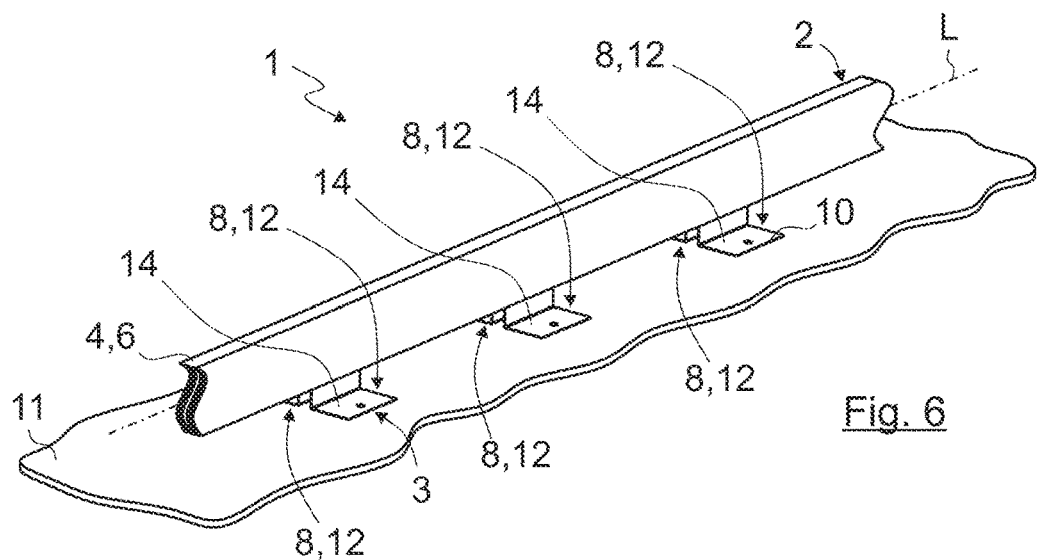
Figure 7:
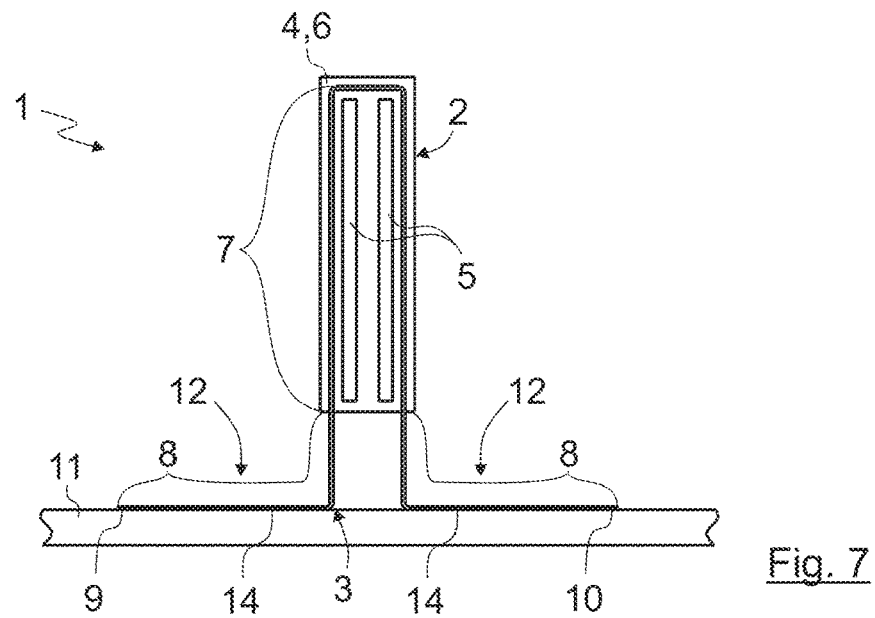
Figure 8:
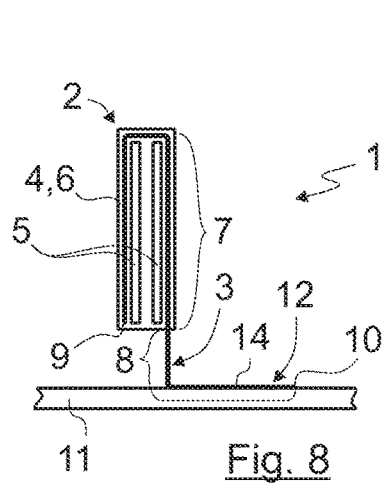
Figure 9:
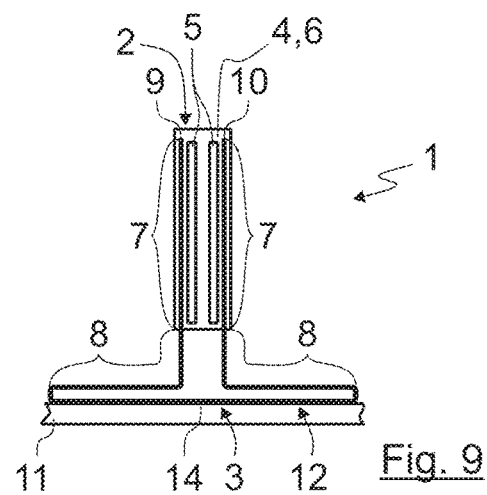
Figure 10:
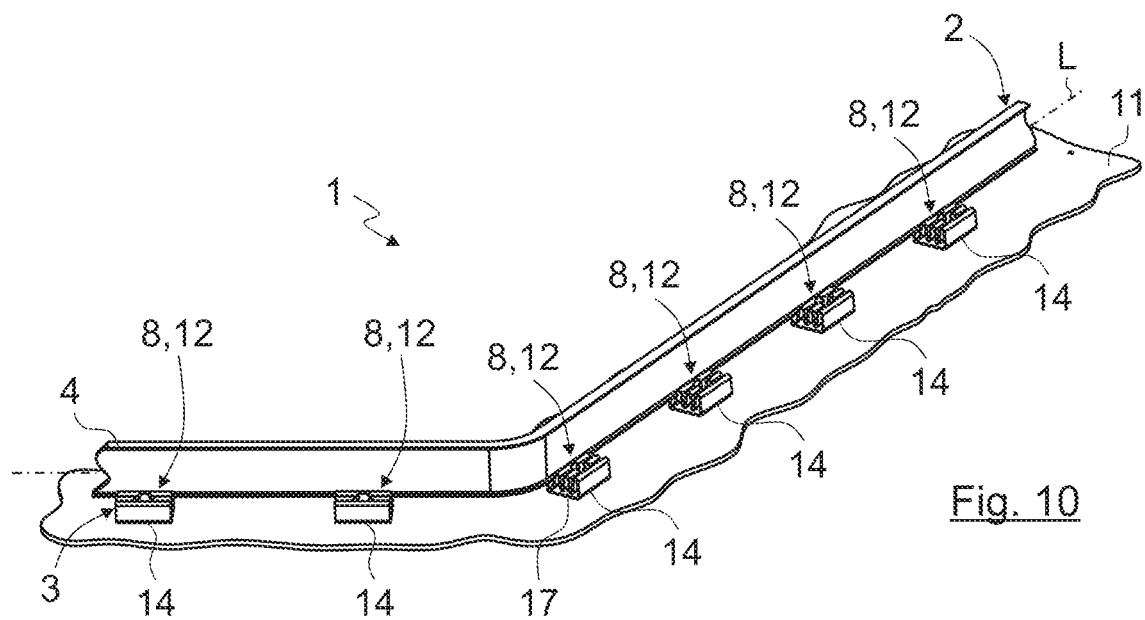
Figure 11:
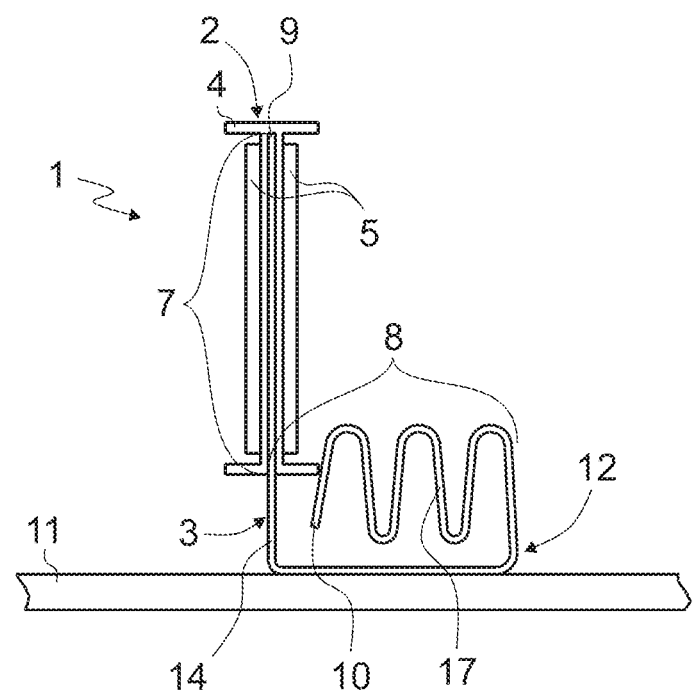
Figure 12:
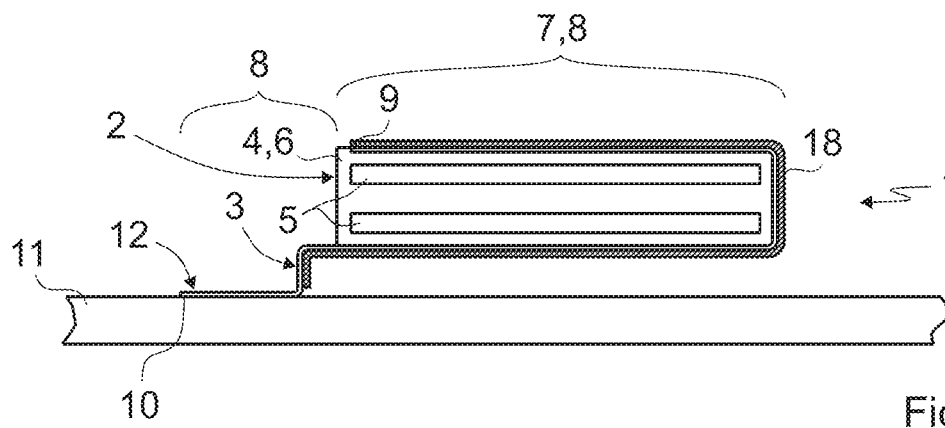
Figure 13:
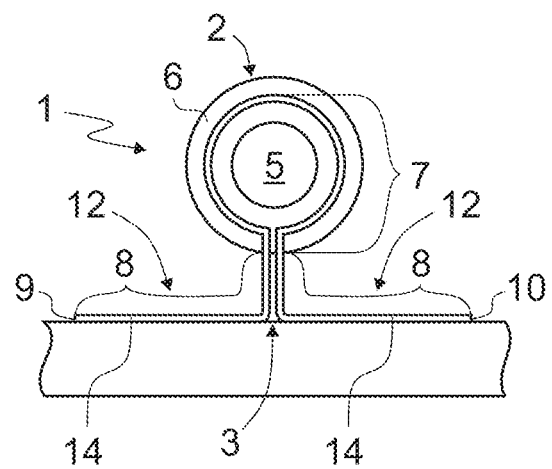
Figure 14:
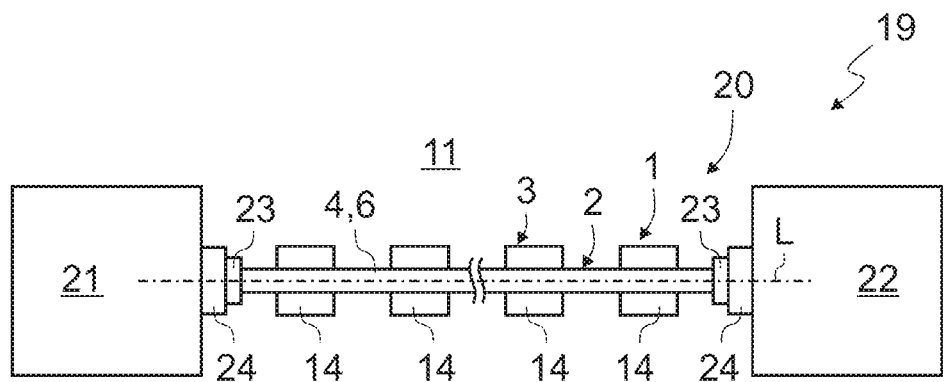
Figure 15:
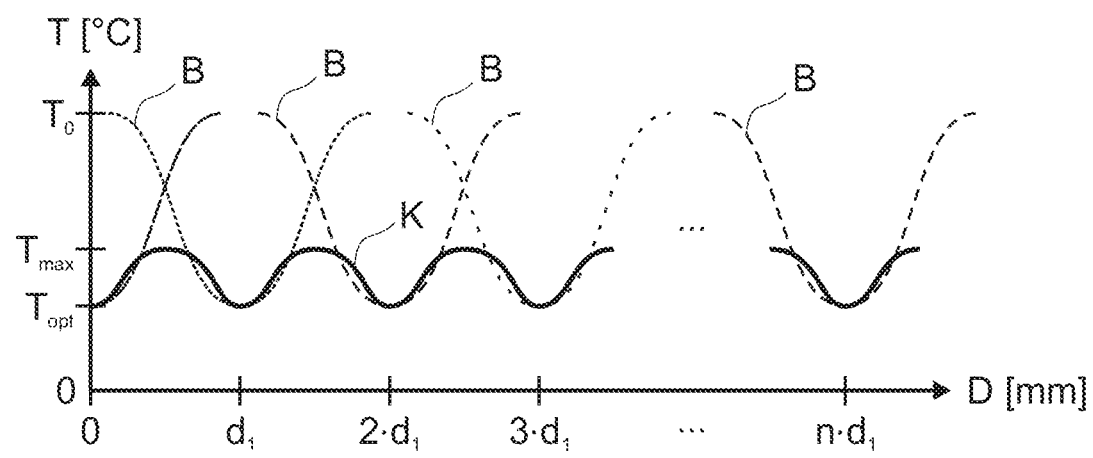

FIG. 1 a first exemplary embodiment of a line arrangement with an electrical line and a heat dissipator connected to a heat sink in a perspective view;

FIG. 2 an end-face view of the line arrangement from FIG. 1;

FIG. 3 a second exemplary embodiment of a line arrangement with an electrical line and a heat dissipator connected to a heat sink in a perspective view;

FIG. 4 an end-face view of the line arrangement in FIG. 3;

FIG. 5 a third exemplary embodiment of a line arrangement with an electrical line and a heat dissipator connected to a heat sink in an end-face view;

FIG. 6 a fourth exemplary embodiment of a line arrangement with an electrical line and a heat dissipator connected to a heat sink in a perspective view;

FIG. 7 an end-face view of the line arrangement from FIG. 6;

FIG. 8 a fifth exemplary embodiment of a line arrangement with an electrical line and a heat dissipator connected to a heat sink in an end-face view;

FIG. 9 a sixth exemplary embodiment of a line arrangement with an electrical line and a heat dissipator connected to a heat sink in an end-face view;

FIG. 10 a seventh exemplary embodiment of a line arrangement with an electrical line and a heat dissipator connected to a heat sink in a perspective view;

FIG. 11 an end-face view of the line arrangement from FIG. 10;

FIG. 12 an eighth exemplary embodiment of a line arrangement with an electrical line and a heat dissipator connected to a heat sink in an end-face view;

FIG. 13 a ninth exemplary embodiment of a line arrangement with an electrical line and a heat dissipator connected to a heat sink in and end-face view;

FIG. 14 an energy transmission system according to the invention, comprising two electrical devices and a connection arrangement interconnecting the electrical devices; and FIG. 15 a representation in graph form of the temperature distribution inside a conductor arrangement as a function of the center-to-center distance between individual heat-emitting lugs.

DETAILED DESCRIPTION OF THE ENABLING EMBODIMENTS

FIGS. 1 to 13 show exemplary different embodiments of a line arrangement 1 according to the invention. Each of the exemplary line arrangements 1 comprises an electrical line 2 and a passive heat dissipator 3.

FIGS. 1 and 2 show a first exemplary embodiment of the line arrangement 1. FIG. 1 shows a perspective view and FIG. 2 an end-face view. The electrical line 2 comprises an electrical insulator formed as an electrically insulating spacer element 4, against which two electrical conductors 5 run adjacently, which extend along the longitudinal axis L of the electrical line 2. The insulating spacer element 4 distances the two conductors 5 from one another in order to prevent a short circuit between the conductors 5 (see particularly simple and economical in particular FIG. 2).

The electrical conductors 5 are formed as elongate flat conductors with a flat cross section. In principle, however, any cross section can be provided, for example also the round cross section shown below in FIG. 13, additionally for example a square cross section, an oval cross section or a comb-shaped cross section. The number of electrical conductors 5 of the electrical line 2 can also be arbitrary in principle, wherein in most exemplary embodiments two electrical conductors 5 are provided to provide a forward conductor and a return conductor in a common electrical line 2. However, also exactly one electrical conductor 5 or more than two electrical conductors 5 can be provided according to the application.

When two electrical conductors 5 are used which are spaced apart from an insulating spacer element 4, as shown, inter alia, in the exemplary embodiment of FIGS. 1 and 2, an electrical insulator formed as an electrically insulating encasement 6, which is shown by dashed lines in FIG. 2, can also optionally be provided and jointly encases the electrical conductors 5 and the insulating spacer element 4.

In principle, further electrical insulators can also be provided, for example an insulator encasing each individual electrical conductor 5. In addition, the insulating spacer element 4 can also already be designed to provide a complete encasement for the electrical conductors 5, as shown for example in FIG. 7 below.

The proposed passive heat dissipator 3 likewise runs at least in some sections along the longitudinal axis L of the electrical line 2. The heat dissipator 3 has at least one heat-absorbing surface portion 7 and at least one heat-emitting surface portion 8 thermally connected to the heat-absorbing surface portion 7. In the exemplary embodiments, in each case exactly one continuous heat-absorbing surface portion 7 is provided, which extends over the entire longitudinal extension of the heat dissipator 3 or of the electrical line 2, as well as a plurality of individual heat-emitting surface portions 8 (see for example FIGS. 1 and 2 in combination).

The heat-absorbing surface portion 7 is brought towards the electrical conductors 5 at least to the extent that the heat-absorbing surface portion 7 forms a thermally operative connection to the electrical conductors 5 in order to dissipate waste heat from the electrical conductors 5 along a heat path W or a plurality of heat paths W to the heat-emitting surface portion 8. In FIG. 1, one of the heat paths is indicated by dashed lines as an example.

Preferably, the heat dissipator 3 is formed in one piece, as shown in the exemplary embodiments, wherein the heat-absorbing surface portions 7 preferably transition directly into the heat-emitting surface portions 8.

In particular, it can be provided that the heat dissipator 3 is formed from a flat, elongate material, for example from a deep-drawn sheet-metal material (e.g. a copper sheet or an aluminum sheet), and has a first longitudinal boundary and a second longitudinal boundary with respect to the longitudinal extension or the longitudinal axis L and a first transverse boundary 9 and a second transverse boundary 10 with respect to the transverse extension Q (see FIG. 1) of the heat dissipator 3. Preferably, the heat-absorbing surface portion 7 additionally runs at least substantially plane-parallel to an outer surface of the electrical conductor 5 and/or follows the course of the outer surface of the electrical conductor 5 at least in some portions. In the preferred variant, the heat dissipation additionally takes place over the full length of the electrical conductor 5 and/or the electrical line 2, which is why the heat-absorbing surface portion 7 and/or the heat dissipator 3 extends over the full length of the electrical conductor 5 along the longitudinal axis L, as already mentioned.

There are different variants for the arrangement of the heat-absorbing surface portion 7 and the heat-emitting surface portion 8 on the main side surfaces of the heat dissipator 3, which are shown in the figures only as excerpts and examples. In all variants, the heat path W extending between the surface portions 7, 8 runs transversely or at an angle to the longitudinal axis L and thus also transversely to the direction of current flow.

Generally, the heat-absorbing surface portion 7 and the heat-emitting surface portion 8 each extend along the longitudinal axis L and span their surface in the transverse direction Q on the main side surface or on the main side surfaces of the heat dissipator 3.

For example, as shown, inter alia, in the first exemplary embodiment of FIGS. 1 and 2, each of the two surface portions 7, 8 can extend from one of the two transverse boundaries 9, 10 and, starting from the transverse boundary 9, 10 associated with it, run in the direction of the other surface portion 8, 7. As can be seen particularly well in FIG. 2, in the first exemplary embodiment it is provided that the heat-absorbing surface portion 7 extends from the first transverse boundary 9 and the heat-emitting surface portion 8 extends from the second transverse boundary 10 of the heat dissipator 3. In the first exemplary embodiment, the heat-absorbing surface portion 7 or the first transverse boundary 9 of the heat dissipator 3 runs inside the electrically insulating spacer element 4 (and also inside the optionally provided electrically insulating encasement 6). For this purpose, the heat-absorbing surface portion 7 is advantageously arranged between the two electrical conductors 5 in an elongate guide channel of the insulating spacer element 4. This allows a particularly direct heat absorption of the heat dissipator 3 and a stable guidance of the heat dissipator 3.

The heat dissipator 3 is led with its heat-emitting surface portion 8 laterally (in the figures "downwards") out of the electrically insulating encasement 6 or out of the electrically insulating spacer element 4, for example through corresponding slots in the insulating spacer element 4 and/or in the insulating encasement.

It is provided that the heat dissipator 3, by means of the heat-emitting surface portion 8, releases the waste heat of the electrical conductors 5 absorbed via the heat-absorbing surface portion 7 to a surrounding structure, in particular to a heat sink 11, and/or to the surrounding environment (e.g. the ambient air or a special cooling fluid). The heat sink 11 can also be a heat storage device.

The heat-emitting surface portion 8 can have at least one connection region 12, which is designed to connect the heat-emitting surface portion 8 in a thermally conductive manner to the heat sink 11 or the structure. The heat sink 11 or the structure can be, for example, a body component of a vehicle. The heat sink 11 can also be part of an active cooling system in which heat removal is increased by having a fluid machine (e.g., a pump or fan) move a fluid (e.g., a cooling fluid or coolant, preferably a liquid coolant, or a gas, such as ambient air) adjacently past the heat-emitting surface portion 8. In the first exemplary embodiment of FIGS. 1 and 2, the connection region 12 is connected to the heat sink 11 via a fastening element formed as a screw 13.

In the preferred variant shown in the figures, the heat dissipator 3 has a plurality of lugs 14 spaced apart along the longitudinal axis L at its second transverse boundary 10 from which the heat emitting surface portions 8 extend. In the first exemplary embodiment, each of the lugs 14 forms a corresponding heat-emitting surface portion 8, all of which are integrally connected to the common heat-absorbing surface portion 7 via the common main side surface of the heat dissipator 3. Preferably, the lugs 14 are evenly distributed along the longitudinal axis L to allow uniform heat dissipation and thus an at least substantially constant temperature gradient inside the electrical conductors 5. A suitable center-to-center spacing $d_1$ of the lugs 14 can be determined on an application-specific basis, for example using simulations or measurements. A possible method for determining an advantageous center-to-center distance $d_1$ will now be presented with reference to FIG. 15. FIG. 15 shows an exemplary temperature distribution inside the line arrangement 1. The lugs 14 are arranged in multiples n of an exemplary center-to-center distance $d_1$ distributed along the longitudinal axis L of the line arrangement 1. The initial temperature $T_0$, which would prevail in the line arrangement 1 without the proposed heat dissipator 3 or without the lugs 14 (at a defined electrical power to be transmitted), is marked in the diagram. Each of the lugs 14 is able to provide a corresponding heat dissipation from the line arrangement 1, which is indicated in the graph for each lug 14 as a corresponding base curve B. The course of this base curve B, in particular the width of the base curve B along the longitudinal axis L of the line arrangement 1 can, for example, be determined metrologically by using suitable thermal sensors. By modifying the center-to-center distance $d_1$, it is now possible to bring the base curves B of the individual lugs 14 into overlap in such a way that a desired maximum temperature $T_{max}$, which is generally formed halfway between two lugs 14, is established. This results in a superimposed temperature curve K from the base curves B. The lowest temperature $T_{opt}$ inside the line arrangement 1 generally occurs directly at the lugs 14.

For example, the center-to-center distance $d_1$ can be 10 mm to 500 mm, preferably 50 mm to 300 mm, particularly preferably 100 mm to 250 mm, even more preferably 150 mm to 200 mm. At this juncture, it should be mentioned again that, as an alternative to the use of individual lugs 14, a continuous heat-emitting surface portion 8 can also be led out of the line arrangement 1.

The heat dissipation also depends on the size of the heat-emitting surface portion 8, i.e. in particular also on the extension of individual lugs 14 along the longitudinal axis L. The longitudinal extension $d_2$ of a lug 14 can in principle be arbitrary and can also be determined application-specifically on the basis of simulations or measurements. For example, the longitudinal extension $d_2$ of a lug 14 can be 5 mm to 100 mm, preferably 10 mm to 80 mm, particularly preferably 30 mm to 70 mm, even more preferably about 50 mm.

Optionally, the heat dissipator 3 or the heat-emitting surface portion 8 or the connection region 12 can also be used to fasten the line arrangement 1 to the adjacent structure or the heat sink 11. Preferably, however, the mechanical fastening is provided by separate fastening means. FIG. 1 shows an example of such a fastening, in addition to the screw connection of the connection region 12 to the heat sink 11. The heat sink 11 has, for example, support elements 15 (not absolutely necessary). For each support element 15, a fastening means designed as a cable tie 16 is provided to lash the line arrangement 1 to the structure or to the heat sink 11. In principle, any fastening means can be provided in order to enable a form-fit, force-fit and/or integrally bonded fastening.

FIGS. 3 and 4 show a second exemplary embodiment of a line arrangement 1 according to the invention. The second exemplary embodiment corresponds substantially to the first exemplary embodiment, but has in particular a different arrangement of the heat-absorbing surface portion 7 and the heat-emitting surface portions 8.

According to the second exemplary embodiment, the heat-absorbing surface portion 7 is formed in a central portion between the two transverse boundaries 9, 10 of the heat dissipator 3, wherein a heat-emitting surface portion 8 extends from each of the two transverse boundaries 9, 10, which in turn are formed on lugs 14 (see in particular FIG. 3). The heat dissipator 3 is thus T-shaped and arranged with its central portion, which comprises the heat-absorbing surface portion 7, inside the electrically insulating spacer element 4. The heat dissipation via the heat dissipating surface portions 8 can be improved due to the enlarged or doubled surface area compared to the first exemplary embodiment. Due to the symmetry, electrical advantages can possibly also result from such an arrangement.

Furthermore, in the second exemplary embodiment of FIGS. 3 and 4 as well as in the further exemplary embodiments, no screw connection of the connection region 12 to the heat sink 11 is provided. Alternatively, for example, a riveted connection, a clinch connection or a material-locking connection (e.g. an adhesive connection) can be provided.

Also, in the exemplary embodiment of FIGS. 3 and 4, an electrically insulating encasement 6 not shown in the drawing can also be provided.

A third exemplary embodiment is shown in FIG. 5. By way of example, the electrical line 2 of FIG. 5 has only a single electrical conductor 5 which is directly surrounded by an electrically insulating encasement 6. As shown in FIG. 5, the heat-absorbing surface portion 7 can optionally also be formed outside the electrical insulator or the electrically insulating encasement 6 and preferably can be mechanically attached to the insulating encasement 6, for example be glued. In this way, waste heat can be absorbed by the electrical conductor 5. To further increase the heat dissipation in the third exemplary embodiment, the heat dissipator 3 or the heat-absorbing surface portion 7 could optionally be folded around at least one, preferably two or three, further side surfaces of the electrical conductor 5 or the electrically insulating encasement 6. However, a heat-absorbing surface portion 7 arranged outside the electrical insulator 4, 6 is usually not necessarily preferred.

FIGS. 6 and 7 show a fourth exemplary embodiment, which is basically similar to the previous exemplary embodiments. The electrical line 2 has two electrical conductors 5, which are encased by a common electrical insulator, which simultaneously fulfills the function of the insulating encasement 6 and an insulating spacer element 4.

Comparably to the exemplary embodiment of FIGS. 3 and 4, the heat-absorbing surface portion 7 is arranged in a central portion of the heat dissipator 3. Starting from both transverse boundaries 9, 10, heat-emitting surface portions 8 extend at respective lugs 14. The heat-absorbing surface portion 7 is arranged running inside the electrical insulator 4, 6.

A variant of the fourth exemplary embodiment is shown in FIG. 8 as the fifth exemplary embodiment. Here again, starting from each transverse boundary 9, 10, respective surface portions 7, 8 extend—in other words, one of the two "feet" of the third exemplary embodiment is omitted.

A sixth exemplary embodiment is shown in FIG. 9. As shown, it can also be provided that the heat-emitting surface portion 8 is provided in the middle portion or between the two transverse boundaries 9, 10, wherein a corresponding heat-absorbing surface portion 7 runs from both transverse boundaries 9, 10.

FIGS. 10 and 11 show a seventh exemplary embodiment of the invention. In order to improve the heat dissipation of the heat-emitting surface portion 8, the heat-emitting surface portions 8 or the lugs 14 have a cooling fin structure comprising a plurality of cooling fins 17. This can increase heat convection and heat radiation. All exemplary embodiments can optionally have a cooling fin structure.

As can also be readily seen from FIG. 10, provision can also be made for the line arrangement 1 to have curved portions and thus to be laid comparatively flexibly along or on the structure or on the heat sink 11.

FIG. 12 is intended to illustrate, with reference to an eighth exemplary embodiment of the invention, a further possibility for increasing the heat emission of the heat-emitting surface portion 8. It can be provided that the heat emitting surface portion 8 has a heat emission layer 18, for example, is coated with a heat emission layer 18 having an emissivity greater than the emissivity of the material of the heat dissipator 3. For example, a dark paint can be provided, whereby the heat emission can be enhanced. All exemplary embodiments can optionally comprise a heat emission layer 18.

As already suggested above with respect to the exemplary embodiment of FIG. 5, the heat dissipator 3 is wrapped around a plurality of side surfaces of the electrical line 2 to increase the heat absorption from the electrical conductors 5. In this case, the heat dissipator 3 is at least partially embedded in the outer surface of the electrical insulator 4, 6. The heat-absorbing surface portion 7 is arranged on the main side surface of the electrical conductor 5 facing the electrical line 2 in the region where the heat dissipator 3 is connected to the electrical line 2. Facing away herefrom, on the second main side surface of the heat dissipator 3, there is arranged the heat-emitting surface portion 8, which is capable of radiating the heat absorbed on the inside to the outside. In addition, the waste heat is also emitted directly to the heat sink 11 via the connection region 12 via a further heat-emitting surface portion 8.

In addition, the exemplary embodiment of FIG. 12 is intended to illustrate that the heat-emitting surface portion 8 or the connection region 12 can form a diverse course or can be reshaped almost arbitrarily to allow various orientations of the line arrangement 1 relative to the adjacent structure or the heat sink 11.

A further exemplary embodiment of a line arrangement 1 is shown in FIG. 13. In particular, FIG. 13 is intended to illustrate that the invention can be suitable for use with any cross section of the electrical conductor or conductors 5, including, for example, use with an electrical conductor 5 having a round cross section as shown. The electrical line 2 in FIG. 13 is constructed in the manner of an electrical cable and has, in addition to the electrical conductor 5, an insulating encasement 6 enveloping the electrical conductor 5, in the manner of a cable sheath. The heat-absorbing surface portion 7 is provided in a central portion of the heat dissipator 3 and runs inside the electrically insulating encasement 6. Two heat-emitting surface portions 8 are provided in the region of the two transverse boundaries 9, 10 of the heat dissipator 3.

The line arrangements 1 described above are suitable in principle for any applications in electrical engineering, but are particularly advantageous for communications engineering and very particularly for high-voltage engineering. FIG. 14 shows an example of an energy transmission system 19.

The energy transmission system 19 has a connection arrangement 20 for electrically connecting a first electrical device 21 and a second electrical device 22 to one another (in principle, more than two electrical devices 21, 22 can also be connected to one another by means of the connection arrangement 20 or the line arrangement 1).

The connection arrangement 20 comprises the line arrangement 1, which can optionally have corresponding electrical connectors 23 at one or both ends (for example, but not necessarily, plug connectors). The electrical connectors 23 can be electrically connected to the electrical conductor 5 of the line arrangement 1 and preferably, as shown, can be arranged at opposite ends of the line arrangement 1 along the longitudinal axis L of the line arrangement 1 or the electrical line 2. For connection to the corresponding electrical device 21, 22, the electrical devices 21, 22 can comprise mating connectors 24 (for example, but not necessarily, mating plug connectors). In principle, the line arrangement 1 or the electrical conductors 5 of the electrical line 2 of the line arrangement 1 can also be directly connected to the electrical devices 21, 22.

Preferably, one of the two electrical devices 21, 22 of the energy transmission system 19 is designed as a primary electrical energy source (for example, as an accumulator, accumulator group or charging device for charging accumulators). The other electrical device 22, 21 can then preferably be designed as an electrical consumer (for example, an electric motor) or as a secondary energy source (for example, as an accumulator or accumulator group).

Particularly preferably, one of the electrical devices 21, 22 is designed as a charging device and the other electrical device 22, 21 is designed as an accumulator or accumulator group in order to connect a charging device to an accumulator or accumulator group by means of the line arrangement 1, in particular in electric vehicles.

Another particularly advantageous application can be the transmission of energy from an accumulator or accumulator group to an electrical consumer, in particular the electric motor of an electric vehicle. As already mentioned, however, any applications can be envisaged in principle.

What is claimed is:

1. A line arrangement comprising:
   an electrical line which has at least one electrical insulator and at least one electrical conductor which runs at least in some sections adjacently to the electrical insulator along a longitudinal axis of the electrical line, and
   a passive heat dissipator which runs at least in some sections along the longitudinal axis and which has at least one heat-absorbing surface portion and at least one heat-emitting surface portion thermally connected to the heat-absorbing surface portion,
   wherein the heat-absorbing surface portion is brought towards the electrical conductor at least to such an extent that the heat-absorbing surface portion enters into a thermally operative connection to the electrical conductor in order to dissipate waste heat of the electrical conductor to the heat-emitting surface portion,
   wherein the heat dissipator has a plurality of lugs spaced from one another along the longitudinal axis, which form the heat-emitting surface portion, and which branch laterally from the at least one heat-absorbing surface portion,
   wherein the heat-absorbing surface portion of the heat conductor extends along the longitudinal axis at least substantially over the entire length of the electrical conductor.

2. The line arrangement according to claim 1, wherein the at least one electrical insulator
   a) is formed as an electrically insulating encasement, wherein the at least one electrical conductor runs at least in some sections along the longitudinal axis inside the electrically insulating encasement; and/or
   b) is formed as an electrically insulating spacer element, wherein at least two of the electrical conductors are spaced apart from one another by means of the electrically insulating spacer element.

3. The line arrangement according to claim 1, wherein the heat dissipator is formed of a flat, elongate material and runs at least substantially plane-parallel to an outer surface of the electrical conductor.

4. The line arrangement according to claim 1, wherein the heat-absorbing surface portion and the heat-emitting surface portion are arranged relative to one another in such a way that a heat path which forms between the surface portions and along which the waste heat of the electrical conductor is dissipated runs at an angle to the longitudinal axis.

5. The line arrangement according to claim 4, wherein the angle is a right angle to the longitudinal axis.

6. The line arrangement according to claim 1, wherein the heat-absorbing surface portion of the heat dissipator runs at least substantially inside the electrical insulator.

7. The line arrangement according to claim 6, wherein the heat-absorbing surface portion of the heat dissipator:
   a) runs inside the electrically insulating encasement; and/or
   b) runs inside the electrically insulating spacer element.

8. The line arrangement according to claim 1, wherein the heat-emitting surface portion of the heat dissipator is led laterally out of the electrical insulator.

9. The line arrangement according to claim 8, wherein the heat dissipator is led laterally out of the electrically insulating encasement and/or laterally out of the electrically insulating spacer element.

10. The line arrangement according to claim 1, wherein the heat-emitting surface portion has at least one connection region which is designed to connect the heat-emitting surface portion heat-conductively to a heat sink.

11. The line arrangement according to claim 1, wherein the heat-emitting surface portion forms cooling fins.

12. The line arrangement according to claim 1, wherein the heat-emitting surface portion has a heat-emitting layer with an emissivity greater than the emissivity of the material of the heat dissipator itself.

13. The line arrangement according to claim 1, wherein the at least one electrical conductor is formed as an elongate flat conductor with a flat cross section.

14. The line arrangement according to claim 1, further comprising at least one fastening means for mechanically fastening the electrical line to an adjacent structure.

15. The line arrangement according to claim 14, wherein the electrical line is mechanically fastened to the heat sink.

16. A connection arrangement having two electrical connectors for electrical connection to a corresponding electrical device, and a line arrangement according to claim 1, wherein the electrical connectors are each electrically connected to the at least one electrical conductor of the line arrangement, and are arranged at opposite ends of the line arrangement along the longitudinal axis.

17. An energy transmission system having the connection arrangement according to claim 16, wherein
   a) the first electrical device of the two electrical devices is formed as a primary electrical energy source; and wherein
   b) the second electrical device of the two electrical devices is designed as an electrical consumer.

18. The energy transmission system of claim 17, wherein the primary electric source is an accumulator, accumulator group or charging device for charging accumulators, and the electrical consumer is as an electric motor, or as a secondary energy source, comprised of an accumulator or accumulator group.

19. A line arrangement comprising:
- an electrical line which has at least one electrical insulator and at least one electrical conductor which runs at least in some sections adjacently to the electrical insulator along a longitudinal axis of the electrical line,
  - a passive heat dissipator which runs at least in some sections along the longitudinal axis and which has at least one heat-absorbing surface portion and at least one heat-emitting surface portion thermally connected to the heat-absorbing surface portion,
  - wherein the heat-absorbing surface portion is brought towards the electrical conductor at least to such an extent that the heat-absorbing surface portion enters into a thermally operative connection to the electrical conductor in order to dissipate waste heat of the electrical conductor to the heat-emitting surface portion,
- wherein the heat dissipator has a plurality of lugs spaced from one another along the longitudinal axis, which form the heat-emitting surface portion, and which branch laterally from the at least one heat-absorbing surface portion, and
- wherein the at least one electrical conductor is formed as an elongate flat conductor with a flat cross section.

* * * * *